United States Patent
Li et al.

(10) Patent No.: US 9,973,352 B2
(45) Date of Patent: May 15, 2018

(54) INFORMATION SENDING METHOD, APPARATUS, AND COMMUNICATIONS SYSTEM

(71) Applicant: HUAWEI TECHNOLOGIES CO., LTD., Shenzhen (CN)

(72) Inventors: Lei Li, Beijing (CN); Pengfei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 15/277,570

(22) Filed: Sep. 27, 2016

(65) Prior Publication Data
US 2017/0019271 A1 Jan. 19, 2017

Related U.S. Application Data

(63) Continuation of application No. PCT/CN2015/074751, filed on Mar. 20, 2015.

(30) Foreign Application Priority Data

Mar. 28, 2014 (CN) .......................... 2014 1 0124078

(51) Int. Cl.
*H04L 12/28* (2006.01)
*H04L 12/64* (2006.01)
(Continued)

(52) U.S. Cl.
CPC .......... *H04L 12/6418* (2013.01); *H04L 45/64* (2013.01); *H04L 47/17* (2013.01);
(Continued)

(58) Field of Classification Search
CPC .................................................. H04L 12/6418
See application file for complete search history.

(56) References Cited

U.S. PATENT DOCUMENTS

| 7,995,572 B2 * | 8/2011 | Kusama | H04L 43/0811 |
| | | | 370/216 |
| 8,270,831 B2 * | 9/2012 | Tanzi | H04J 14/0257 |
| | | | 398/49 |

(Continued)

FOREIGN PATENT DOCUMENTS

| CN | 1612562 | 5/2005 |
| CN | 101753581 | 6/2010 |
| CN | 103607349 | 2/2014 |

OTHER PUBLICATIONS

International Search Report, dated Jul. 8, 2015, in International Application No. PCT/CN2015/074751 (4 pp.).

(Continued)

*Primary Examiner* — Gerald Smarth
(74) *Attorney, Agent, or Firm* — Staas & Halsey LLP

(57) ABSTRACT

The application provide an information sending method which includes: sending, by a controller, a forwarding indication message to a forwarder, where: the forwarding indication message includes at least two routing correspondences and a tunnel correspondence, the at least two routing correspondences include a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to a public network tunnel. The embodiments of the application resolve a problem that a delivering form of a forwarding indication message that is from a control plane to a forwarding plane is not explicitly stipulated in an OpenFlow standard of an SDN.

3 Claims, 2 Drawing Sheets

(51) Int. Cl.
*H04L 12/801* (2013.01)
*H04L 12/937* (2013.01)
*H04L 12/715* (2013.01)
*H04W 40/02* (2009.01)

(52) U.S. Cl.
CPC ........... *H04L 49/254* (2013.01); *H04W 40/02* (2013.01); *Y02B 60/50* (2013.01)

(56) References Cited

U.S. PATENT DOCUMENTS

| 9,036,477 | B2* | 5/2015 | Xu | H04L 47/17 |
| | | | | 370/235 |
| 9,210,074 | B2* | 12/2015 | Hao | H04L 47/80 |
| 9,281,951 | B2* | 3/2016 | Asati | H04L 12/18 |
| 2013/0279504 | A1 | 10/2013 | Gulati et al. | |

OTHER PUBLICATIONS

Written Opinion of the International Searching Authority, dated Jul. 8, 2015, in International Application No. PCT/CN2015/074751 (7 pp.).
Extended European Search Report, dated Apr. 6, 2017, in European Application No. 15769681.6 (33 pp.).
Das, S., *PAC.C: A Unified Control Architecture for Packet and Circuit Network Convergence,* XP-55234588A, pp. 1-261.
Hampel, G. et al., *Applying Software-Defined Networking to the Telecom Domain,* 16th IEEE Global Internet Symposium, XP-32436447A, pp. 133-138.
*OpenFlow Switch Specification, Version 1.4.0 (Wire Protocol 0x05),* Oct. 14, 2013, XP-55322618A, pp. 1-206.
International Search Report dated Jul. 8, 2015 in corresponding International Application No. PCT/CN2015/074751.

* cited by examiner

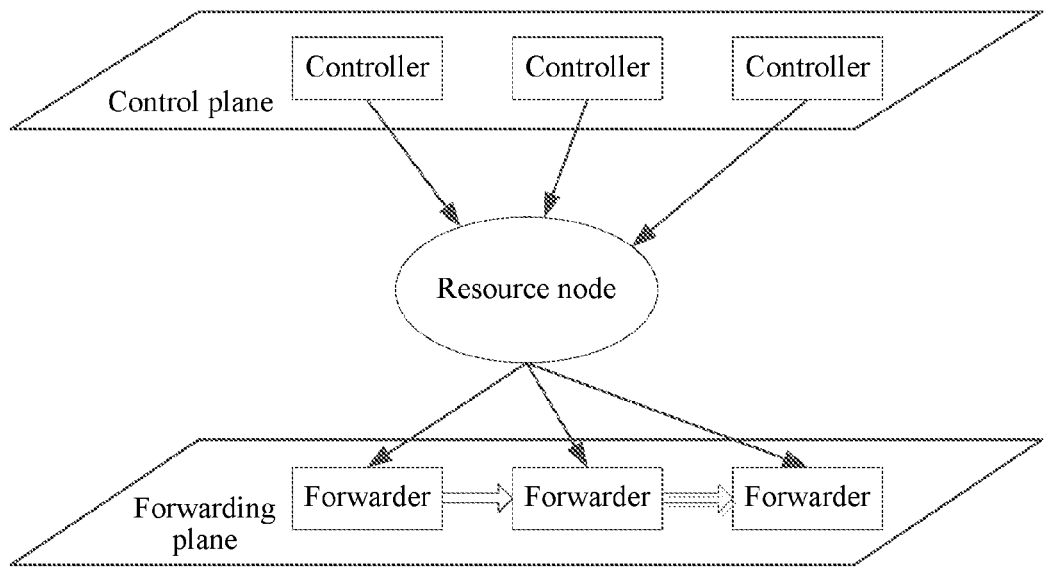
FIG. 1
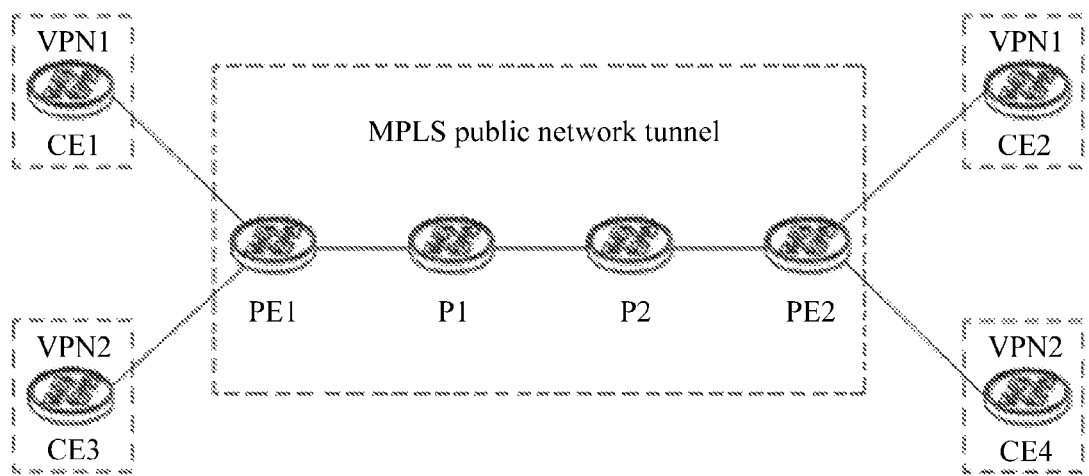
FIG. 2
FIG. 3

INFORMATION SENDING METHOD, APPARATUS, AND COMMUNICATIONS SYSTEM

CROSS-REFERENCE TO RELATED APPLICATIONS

This application is a continuation of International Application No. PCT/CN2015/074751, filed on Mar. 20, 2015, which claims priority to Chinese Patent Application No. 201410124078.4, filed on Mar. 28, 2014. The disclosures of the aforementioned applications are hereby incorporated by reference in their entireties.

TECHNICAL FIELD

Embodiments of the application relate to the field of communications technologies, and in particular, to an information sending method, an apparatus, and a communications system.

BACKGROUND

An architecture of software-defined networking (SDN) can be divided into a control plane and a forwarding plane. The control plane possesses data about all interfaces, routes, and the like of the forwarding plane, and is responsible for establishing a path. The forwarding plane performs data forwarding. The control plane needs to deliver a formed forwarding indication message to the forwarding plane, so that the forwarding plane implements data forwarding according to the forwarding indication message. However, a delivering form of a forwarding indication message that is from the control plane to the forwarding plane is not explicitly stipulated in an OpenFlow standard of the SDN.

SUMMARY

Embodiments of the application provide an information sending method, an apparatus, and a communications system, so as to resolve a problem that a delivering form of a forwarding indication message that is from a control plane to a forwarding plane is not explicitly stipulated in an OpenFlow standard of an SDN.

According to a first aspect, an embodiment of the application provides an information sending method, including:

sending, by a controller, a forwarding indication message to a forwarder, where: the forwarding indication message includes at least two routing correspondences and a tunnel correspondence, the at least two routing correspondences include a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to a public network tunnel.

With reference to the first aspect, in a first possible implementation manner of the first aspect, the tunnel correspondence is a correspondence of the next hop identifier to multiple public network tunnels.

According to a second aspect, an embodiment of the application provides a control apparatus, including:

a message sending module, configured to send a forwarding indication message to a forwarder, where: the forwarding indication message includes at least two routing correspondences and a tunnel correspondence, the at least two routing correspondences include a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to a public network tunnel.

With reference to the second aspect, in a first possible implementation manner of the second aspect, the tunnel correspondence is a correspondence of the next hop identifier to multiple public network tunnels.

According to a third aspect, an embodiment of the application provides a communications system, including a control apparatus and a forwarding apparatus, where:

the control apparatus uses the apparatus according to the second aspect or the first possible implementation manner of the second aspect; and the forwarding apparatus is configured to perform packet forwarding according to a forwarding indication message sent by the control apparatus.

According to an information sending method, an apparatus, and a communications system in the embodiments of the application, by delivering forwarding information to a forwarder in a manner of a data forwarding model, a controller maps private network routes of multiple public network tunnels to same multiple public network tunnel information to reduce a delivering data volume, so as to resolve a problem that a delivering form of a forwarding indication message that is from a control plane to a forwarding plane is not explicitly stipulated in an OpenFlow standard of an SDN and improve system performance.

BRIEF DESCRIPTION OF DRAWINGS

To describe the technical solutions in the embodiments of the application more clearly, the following briefly describes the accompanying drawings required for describing the embodiments. Apparently, the accompanying drawings in the following description show some embodiments of the application, and persons of ordinary skill in the art may still derive other drawings from these accompanying drawings without creative efforts.

FIG. 1 is a schematic structural diagram of a topology of an SDN network;

FIG. 2 is a flowchart of an embodiment of an information delivering method according to the application;

FIG. 3 is a schematic structural diagram of an L3VPN network that supports MPLS;

DESCRIPTION OF EMBODIMENTS

Figure 4:
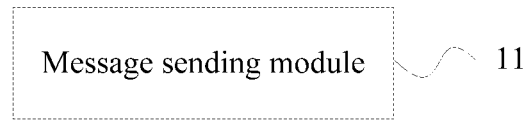
FIG. 4 is a schematic structural diagram of an embodiment of a control apparatus according to the application.

An SDN network is divided into a control plane and a forwarding plane. FIG. 1 is a schematic structural diagram of a topology of an SDN network. As shown in FIG. 1, the control plane includes one or more controllers, and the forwarding plane includes multiple forwarders. A forwarding indication message required by a forwarder to perform data forwarding is formed and sent by a controller. The controller controls, by using the forwarding indication message, forwarding of a packet performed by a forwarder.

The forwarders in the forwarding plane can all be managed by one controller. The controller centrally controls the forwarders that are in the forwarding plane, and the controller sends a forwarding indication message. In a case in which the control plane includes multiple controllers, the multiple forwarders in the forwarding plane may further be managed by different controllers, that is, each controller manages at least one of the forwarders in the forwarding plane. Each controller controls a forwarder managed by the controller, and the controller sends the forwarding indication message to the forwarder managed by the controller.

Optionally, a resource node may be disposed between the control plane and the forwarding plane. The resource node may be a personal computer (English: personal computer, PC for short), or may be a software module or a component deployed in the controller. Communication between the resource node and the forwarder may be based on an OpenFlow standard. The resource node knows information about all controllers, and further knows forwarding indication messages required by the entire forwarding plane, and a forwarder to which these forwarding indication messages should be sent. The resource node sends the forwarding indication messages to a corresponding forwarder.

The SDN network includes a public network tunnel provided by an operator. For example, the public network tunnel may be a Multiprotocol Label Switching (MPLS) public network tunnel. Two customer edge (CE) routers of different areas in a same virtual private network (VPN) need to use the MPLS public network tunnel to perform data interaction. Generally, an entry of a forwarding indication message delivered by the controller includes: an IP address prefix, a mask, a next hop, an outbound interface, and an outgoing label, where the next hop may be a next hop node represented by using an Ethernet address, the outbound interface is corresponding to an actual physical interface of the forwarder, and the outgoing label is used to identify the next hop and the outbound interface.

A private network route may be represented by using a combination of the IP address prefix and the mask. The private network route may be a host route, or may be a route prefix. In a case in which the private network route is the host route, a value of the IP address prefix is an IP address, and the mask is all ones. If there are 100 thousand private network routes, the delivered forwarding indication message has 100 thousand entries, where each entry includes the foregoing content. It is assumed that different combinations of these 100 thousand IP address prefixes and masks are corresponding to a same next hop, outbound interface, and outgoing label. The controller will send same data 100 thousand times, which causes a large amount of data redundancy.

To make the objectives, technical solutions, and advantages of the embodiments of the application clearer, the following clearly describes the technical solutions in the embodiments of the application with reference to the accompanying drawings in the embodiments of the application. Apparently, the described embodiments are a part rather than all of the embodiments of the application. All other embodiments obtained by persons of ordinary skill in the art based on the embodiments of the application without creative efforts shall fall within the protection scope of the application.

FIG. 2 is a flowchart of an embodiment of an information delivering method according to the application. As shown in FIG. 2, the method in this embodiment may include:

Step 101: A controller sends a forwarding indication message to a forwarder.

The forwarding indication message includes at least two routing correspondences and a tunnel correspondence, where the at least two routing correspondences include a first routing correspondence and a second routing correspondence, where the first routing correspondence is mapping of a first route to a next hop identifier, and the second routing correspondence is mapping of a second route to the next hop identifier; the tunnel correspondence is a correspondence of the next hop identifier to a public network tunnel. In a case in which the public network tunnel is an MPLS tunnel, the public network tunnel is represented by using a combination of a next hop, an outbound interface, and an outgoing label. In a case in which the public network tunnel is a Generic Routing Encapsulation (English: Generic Routing Encapsulation, GRE for short) tunnel, the public network tunnel is represented by using a combination of a next hop and an outbound interface.

In this embodiment, the first route and the second route are different private network routes. A length of the next hop identifier herein is less than a length of the public network tunnel, such as a sum of lengths of the next hop, the outbound interface, and the outgoing label. The next hop identifier is used to differentiate a public network tunnel. Each next hop identifier is corresponding to one public network tunnel, and different next hop identifiers are corresponding to different public network tunnels.

If different combinations of the 100 thousand IP address prefixes and masks are corresponding to a same public network tunnel, the controller sends a forwarding indication message to the forwarder, where the forwarding indication message includes 100 thousand routing correspondences, each of the 100 thousand routing correspondence is mapping of a route to a same next hop identifier, and therefore a total data volume is a data volume of 100 thousand private network routes plus a data volume of 100 thousand next hop identifiers. The forwarding indication message further includes a tunnel correspondence, where the tunnel correspondence includes only one entry, that is, the foregoing mapping of the next hop identifier to the public network tunnel, and a total data volume is a data volume of the next hop identifier plus data volumes of a next hop, an outbound interface, and an outgoing label. In comparison with a simple solution of sending all correspondences of IP address prefixes, masks, next hops, outbound interfaces, and outgoing labels, data volumes of about 100 thousand next hops, outbound interfaces, and outgoing labels are reduced.

FIG. 3 is a schematic structural diagram of an L3VPN network that supports MPLS. As shown in FIG. 3, CE1 and CE2 belong to a VPN1, and CE3 and CE4 belong to a VPN2. Data interaction between the CE1 and the CE2, and between the CE3 and the CE4 needs to be performed through an MPLS public network tunnel provided by an operator. This public network tunnel includes a provider edge (English: provider edge, PE for short) router PE1, provider (English: provider, P for short) routers P1 and P2, and a PE router PE2. The VPN1 and VPN2 share the MPLS public network tunnel.

The structure shown in FIG. 3 is used as an example to illustrate a forwarding operation performed by the PE1 on a packet that is from the VPN1. A destination IP address of a packet that is from the CE1 of the VPN1 to the PE1 is an address of a terminal connected to the CE2, such as 9.9.9.9, and the PE1 learns, according to a sending source of the packet, a VPN1 label corresponding to the packet, such as 1024, and learns the packet according to the destination IP address and forwards the packet to the CE2. The PE1 learns, according to a forwarding indication message delivered by a controller, a public network tunnel in which the packet is forwarded.

In this embodiment, in an SDN network, a manner of data delivering from a control plane to a forwarding plane is provided. A delivered forwarding indication message includes at least two routing correspondences, and multiple private network routes is made, by using a next hop identifier, corresponding to a same public network tunnel, so as to eliminate a redundant data volume and improve system performance.

Further, in step 101 of the foregoing method embodiment, the tunnel correspondence is a correspondence of the next hop identifier to multiple public network tunnels.

Specifically, the tunnel correspondence in the forwarding indication message may further be a correspondence of the next hop identifier to multiple public network tunnels. For example, from PE1 to PE2, there may further be another public network tunnel except an MPLS public network tunnel, such as a GRE tunnel. In this case, multiple public network tunnels to the PE2 form a group, which is represented by using a next hop identifier. Each next hop identifier is corresponding to one group, and different next hop identifiers are corresponding to different groups. This next hop identifier may also be referred to as a next hop group identifier. Further, if a tunnel identifier is used to represent a public network tunnel, and each group includes multiple public network tunnels, one next hop identifier is corresponding to multiple tunnel identifiers, and each tunnel identifier is mapped to one public network tunnel. The controller may configure a public network tunnel load balancing manner, for example, load of multiple public network tunnels is equal, or a primary-secondary sequence is preconfigured for multiple public network tunnels, so that the forwarder determines a public network tunnel according to a next hop identifier and the load balancing manner.

FIG. 4 is a schematic structural diagram of an embodiment of a control apparatus according to the application. As shown in FIG. 4, the apparatus in this embodiment may include a message sending module 11, configured to send a forwarding indication message to a forwarder, where: the forwarding indication message includes at least two routing correspondences and a tunnel correspondence, the at least two routing correspondences include a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to a public network tunnel.

The apparatus in this embodiment may be configured to execute the technical solution in the method embodiment shown in FIG. 2, and implementation principles and technical effects thereof are similar, and details are not described herein.

Further, the tunnel correspondence is a correspondence of the next hop identifier to multiple public network tunnels.

Figure 5:
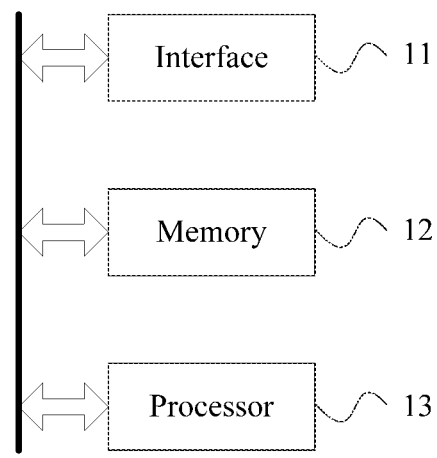
FIG. 5 is a schematic structural diagram of an embodiment of a controller according to the application.

FIG. 5 is a schematic structural diagram of an embodiment of a controller according to the application. As shown in FIG. 5, a device in this embodiment includes: an interface 11, a memory 12, and a processor 13, where the interface 11, the memory 12, and the processor 13 are connected by using a bus.

The interface 11 may be one or more of the following: a network interface controller (English: network interface controller, NIC for short) that provides a wired interface, such as an Ethernet NIC; an NIC that provides a wireless interface, such as a wireless local area network (English: wireless local area network, WLAN for short) NIC.

The memory 12 stores program code and a forwarding indication message, and transmit stored program code to the processor 13.

The memory 12 may be a volatile memory (English: volatile memory), such as a random access memory (English: random-access memory, RAM for short); or a non-volatile memory (English: non-volatile memory), such as a flash memory (English: flash memory), a hard disk drive (English: hard disk drive, HDD for short), or a solid-state drive (English: solid-state drive, SSD for short); or any combination of the memories of the foregoing types.

The processor 13 obtains the program code stored in the memory 12, and performs, according to the obtained program code, step 101 of the method embodiment shown in FIG. 2, where the interface 11 sends a forwarding indication message to a forwarder, where: the forwarding indication message includes at least two routing correspondences and a tunnel correspondence, the at least two routing correspondences include a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to a public network tunnel. Further, the tunnel correspondence may further be a correspondence of the next hop identifier to multiple public network tunnels.

The processor 13 may be a central processing unit (English: central processing unit, CPU for short), or may be a combination of a CPU and a hardware chip. The foregoing hardware chip may be an application-specific integrated circuit (English: application-specific integrated circuit, ASIC for short), a programmable logic device (English: programmable logic device, PLD for short) or a combination thereof. The foregoing PLD may be a complex programmable logic device (English: complex programmable logic device, CPLD for short), a field-programmable gate array (English: field-programmable gate array, FPGA for short), generic array logic (English: generic array logic, GAL for short), or any combination thereof.

Figure 6:
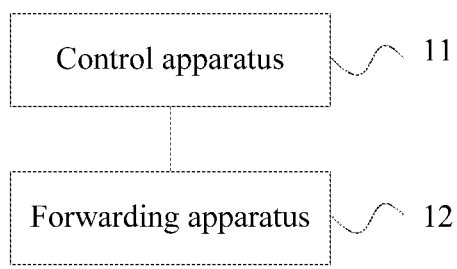
FIG. 6 is a schematic structural diagram of Embodiment 1 of a communications system according to the application.

FIG. 6 is a schematic structural diagram of Embodiment 1 of a communications system according to the application. As shown in FIG. 6, the system in this embodiment may include: a control apparatus 11 and a forwarding apparatus 12. The control apparatus 11 may use the structure of the apparatus embodiment shown in FIG. 4. Accordingly, the control apparatus 11 may execute the technical solution of the method embodiment shown in FIG. 2; implementation principles and technical effects thereof are similar, and details are not described herein. The forwarding apparatus 12 is configured to perform packet forwarding according to a forwarding indication message sent by the control apparatus 11.

Figure 7:
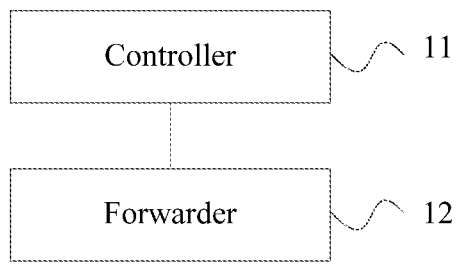
FIG. 7 is a schematic structural diagram of Embodiment 2 of a communications system according to the application.

FIG. 7 is a schematic structural diagram of Embodiment 2 of a communications system according to the application. As shown in FIG. 7, the system in this embodiment may include: a controller 11 and a forwarder 12. The controller 11 may use the structure of the device embodiment shown in FIG. 5. Accordingly, the controller 11 may execute the technical solution of the method embodiment shown in FIG. 2; implementation principles and technical effects thereof are similar, and details are not described herein. The forwarder 12 is configured to perform packet forwarding according to a forwarding indication message sent by the controller 11.

Persons of ordinary skill in the art may understand that all or some of the steps of the method embodiments may be implemented by a program instructing a processor. The foregoing program may be stored in a computer-readable storage medium. When the program runs, the steps of the method embodiments are performed. The foregoing storage medium includes: any medium that can store program code, such as a read-only memory (English: read-only memory, ROM for short), an RAM, a magnetic disk, or an optical disc.

Finally, it should be noted that the foregoing embodiments are merely intended for describing the technical solutions of the application, but not for limiting the application. Although the application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the application.

What is claimed is:

1. An information sending method, comprising:
sending, by a controller, a forwarding indication message to a forwarder, wherein: the forwarding indication message comprises at least two routing correspondences and a tunnel correspondence, the at least two routing correspondences comprise a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to multiple public network tunnels.

2. A control apparatus, comprising:
a memory storing instructions; and
a processor to execute the instructions to configure the processor to send a forwarding indication message to a forwarder, wherein: the forwarding indication message comprises at least two routing correspondences and a tunnel correspondence, the at least two routing correspondences comprise a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to multiple public network tunnels.

3. A communications system, comprising:
a forwarding apparatus; and
a control apparatus comprising:
    a memory storing instructions; and
    a processor to execute the instructions to configure the processor to send a forwarding indication message to a forwarder, wherein: the forwarding indication message comprises at least two routing correspondences and a tunnel correspondence, the at least two routing correspondences comprise a first routing correspondence and a second routing correspondence, the first routing correspondence is mapping of a first route to a next hop identifier, the second routing correspondence is mapping of a second route to the next hop identifier, and the first route is different from the second route; and the tunnel correspondence is a correspondence of the next hop identifier to a public network tunnel; wherein the tunnel correspondence is a correspondence of the next hop identifier to multiple public network tunnels; and
the forwarding apparatus is configured to perform packet forwarding according to the forwarding indication message sent by the control apparatus.

* * * * *